United States Patent
Stahle (10) Patent No.: US 11,161,488 B2
(45) Date of Patent: Nov. 2, 2021

(54) BRAKE COMPLIANCE CALIBRATION WITH ELECTROHYDRAULIC BRAKES

(71) Applicant: Deere & Company, Moline, IL (US)

(72) Inventor: Scott R. Stahle, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 177 days.

(21) Appl. No.: 16/668,601

(22) Filed: Oct. 30, 2019

(65) Prior Publication Data
US 2021/0129813 A1 May 6, 2021

(51) Int. Cl.
B60T 8/18 (2006.01)
B60T 15/48 (2006.01)
B60T 13/68 (2006.01)

(52) U.S. Cl.
CPC .......... B60T 8/1806 (2013.01); B60T 13/686 (2013.01); B60T 15/48 (2013.01)

(58) Field of Classification Search
CPC ...... B60T 13/686; B60T 8/1806; B60T 15/48; F15B 2211/855; F15B 2211/857; F15B 19/002
USPC ........................................................ 303/22.8
See application file for complete search history.

(56) References Cited

U.S. PATENT DOCUMENTS

| | | | |
|---|---|---|---|
| 6,213,572 B1 | 4/2001 | Linkner, Jr. et al. | |
| 6,748,311 B1 * | 6/2004 | Walenty | B60W 10/184 701/70 |
| 9,221,445 B2 | 12/2015 | Schmitt | |
| 10,081,344 B2 | 9/2018 | Böhm | |
| 10,173,661 B2 | 1/2019 | Rifici | |
| 2004/0012251 A1 * | 1/2004 | O'Dea | B60T 8/36 303/113.1 |
| 2011/0071738 A1 * | 3/2011 | Kawasaki | E02F 9/2075 701/50 |

(Continued)

FOREIGN PATENT DOCUMENTS

| | | |
|---|---|---|
| DE | 4428929 A1 | 2/1996 |
| DE | 19939386 A1 | 3/2000 |

(Continued)

OTHER PUBLICATIONS

German Search Report issued in counterpart application No. 102020211838.8 dated May 27, 2021 (10 pages).

*Primary Examiner* — Robert A. Siconolfi
*Assistant Examiner* — San M Aung
(74) *Attorney, Agent, or Firm* — Taft Stettinius & Hollister LLP; Stephen F. Rost (57) ABSTRACT

An EH braking system including a brake valve operably connected to a brake and a brake pressure sensor. A calibration event for the EH braking system where the compliance calibration time is measured from when the brake valve is operated at full activation to when the brake pressure sensor senses the pressure starts to build in the brake circuit. The compliance calibration time is the time it takes to fill the compliance volume of the brake(s). The compliance calibrated fill time is used during a normal braking event wherein the brake valve will be operated to a full activation condition for duration of the compliance calibration time. After the calibrated fill time has elapsed, the brake valve will be operated at the desired operator command of the brake pedal. This results in quicker fill times of the brake and better brake system response.

20 Claims, 8 Drawing Sheets

(56) References Cited

U.S. PATENT DOCUMENTS

2018/0029569 A1\* 2/2018 Schick .................. B60T 15/028

FOREIGN PATENT DOCUMENTS

| | | |
|---|---|---|
| DE | 10053606 A1 | 5/2002 |
| DE | 10259319 A1 | 7/2003 |
| DE | 102004057878 A1 | 10/2005 |
| DE | 102005014097 A1 | 4/2006 |
| DE | 102016108597 A1 | 11/2017 |
| DE | 102016112335 A1 | 1/2018 |
| DE | 112016004483 T5 | 6/2018 |
| DE | 102017003784 A1 | 10/2018 |
| DE | 102017222954 A1 | 6/2019 |
| WO | WO2004101339 A1 | 11/2004 |

\* cited by examiner

BRAKE COMPLIANCE CALIBRATION WITH ELECTROHYDRAULIC BRAKES

FIELD OF THE DISCLOSURE

The present disclosure relates to EH brakes and more particularly to determining a compliance calibrated fill time that is used during a normal braking event to operate a brake valve to a full activation condition for duration of the compliance calibration time and thereafter the brake valve will be operated at the desired operator command of the brake pedal.

BACKGROUND

A common issue with hydraulic applied service brake performance consistency is the compliance of the brake(s). The size of the brake valve is dependent on filling the brake valve in a reasonable amount of time. Due to manufacturing tolerances the brake compliance can vary from brake to brake. This compliance variation makes it difficult to design a braking system that is consistent from machine to machine. The compliance results in a delay from when the operator presses the pedal to when the brake(s) can provide a retarding force to machine travel due to the time required to fill the brake(s).

Traditional braking systems use a pedal that is mechanically linked to a hydraulic brake valve. The amount of flow through the valve is proportional to the amount of displacement of the pedal and the hydraulic brake valve. The further distance or amount that the operator pushes down on the pedal or the amount that the pedal is engaged, the more the hydraulic brake valve opens up and the more flow that is dispelled through the hydraulic brake valve. As such, at lower brake pedal commands, the response may be delayed due to the time to fill the brake(s).

Thus there is a need for improved brake compliance fill times.

SUMMARY

Various aspects for improving brake compliance fill time are disclosed. One aspect includes a method, comprising: initiating a calibration event for an electro-hydraulic braking system including a brake valve operably connected to a brake and a brake pressure sensor, and a controller operably connected to the electro-hydraulic braking system; operating the brake valve to a full activation condition; measuring a compliance calibration time for the brake valve in response to operation of the brake valve at the full activation condition; determining a pressure event associated with the brake pressure sensor; and terminating the measurement of the compliance calibration time in response to occurrence of the pressure event.

In one form the method, further comprising: wherein the electro-hydraulic braking system includes a second brake valve operably connected to a second brake and a second brake pressure sensor; operating the second brake valve to a full activation condition; measuring a compliance calibration time for the second brake valve in response to operation of the second brake valve at the full activation condition; determining a pressure event associated with the second brake pressure sensor; and terminating the measurement of the compliance calibration time in response to occurrence of the pressure event.

In another form the method, further comprising; wherein the electro-hydraulic braking system includes a second brake valve operably connected to the first brake and first brake pressure sensor; concurrently operating the first and second brake valves to a full activation condition; measuring a compliance calibration time for the braking system in response to concurrent operation of the first and second brake valves at the full activation condition; and determining a pressure event associated with the brake pressure sensor; and terminating the measurement of the compliance calibration time in response to occurrence of the pressure event.

In yet another form the method, further comprising: detecting a normal braking event of the electro-hydraulic braking system; and operating the brake valve to a full activation condition for duration of the compliance calibration time in response to the normal braking event. In one refinement of this method, further comprising: operating the brake valve at an operator input braking condition in response to the duration of the compliance calibration time being met. In another refinement of this method, wherein electro-hydraulic braking system includes a brake pedal coupled to a position sensor configured to measure a brake pedal position, the detecting the normal braking event includes measuring the brake pedal position in response to an operator input braking demand. In yet another refinement of this method, further comprising: if the operator releases the pedal prior to the compliance calibration time being met, the full activation condition of the brake valve shall be cancelled and instead the brake valve command will once again follow the brake pedal demand.

In another form of the method, wherein electro-hydraulic braking system includes a hydraulic pump for pumping hydraulic fluid from a hydraulic fluid reservoir to the brake valve.

In yet another form of the method, wherein the controller is configured to initiate the calibration event in response to one of the following conditions being met: (i) a calibration request initiated by the operator through the vehicle monitor; (ii) a calibration automatically initiated by the vehicle software at machine start up; or (iii) a calibration automatically initiated by the vehicle software when the park brake is applied.

In yet another form of the method, wherein the controller is configured to require one or more of the following pre-conditions to be met to initiate a calibration event: (i) a hydraulic oil temperature within predetermined limits; (ii) an engine speed within predetermined limits; (iii) a park brake engaged; (iv) a brake pedal command within predetermined limits; (v) a service hour interval being met; or (vi) a brake pressure within predetermined limits.

In a second aspect an apparatus, comprising: an electro-hydraulic braking system including a brake valve operably connected to a brake and a brake pressure sensor; a controller operably connected to the electro-hydraulic braking system, wherein the controller is configured to:

initiate a calibration event associated with the electro-hydraulic braking system; operate the brake valve to a full activation condition; measure a compliance calibration time for the brake valve in response to operation of the brake valve at the full activation condition; determine a pressure event associated with the brake pressure sensor; and terminate the measurement of the compliance calibration time in response to the pressure event.

In one form, the apparatus, further comprising: wherein the electro-hydraulic braking system includes a second brake valve operably connected to a second brake and a second brake pressure sensor; wherein the controller is configured to: operate the second brake valve to a full activation condition; measure a compliance calibration time for the second brake valve in response to operation of the second brake valve at the full activation condition; determine a pressure event associated with the second brake pressure sensor; and terminate the measurement of the compliance calibration time in response to the pressure event.

In another form the apparatus, further comprising: wherein the electro-hydraulic braking system includes a second brake valve operably connected to the brake and the brake pressure sensor; wherein the operate the brake valve includes the controller configured to operate the second brake valve to a full activation condition; wherein the measure the compliance calibration time includes the controller configured to measure a second compliance calibration time for the second brake valve in response to operation of the second brake valve at the full activation condition; and wherein the terminate the measurement of compliance calibration time includes the controller configured to terminate the measurement of the second compliance calibration time in response to the pressure event.

In yet another form the apparatus, further comprising: the controller is configured to detect a normal braking event during travel motion of a vehicle that includes the electro-hydraulic braking system; and the controller configured to operate the brake valve to the full activation condition for duration of the compliance calibration time in response to the normal braking event. In one refinement of the apparatus, further comprising: the controller is configured to operate the brake valve at an operator input brake demand in response to the duration of the compliance calibration time being met. In another refinement of the apparatus, wherein the electro-hydraulic braking system includes a brake pedal coupled to a position sensor configured to measure a brake pedal position, the detection of the normal braking event includes measuring the brake pedal position in response to an operator input brake demand.

In a further form of the apparatus, wherein the electro-hydraulic braking system includes a hydraulic pump configured to pump hydraulic fluid from a hydraulic fluid reservoir to the brake valve.

In yet a further form of the apparatus, wherein the controller is configured to initiate the calibration event in response to one of the following conditions being met: (i) a calibration request initiated by the operator through the vehicle monitor; (ii) a calibration automatically initiated by the vehicle software at machine start up; or (iii) a calibration automatically initiated by the vehicle software when the park brake is applied. In another refinement of the apparatus, wherein one or more of the following pre-conditions must be met to initiate a calibration event: (i) a hydraulic oil temperature within predetermined limits; (ii) an engine speed within predetermined limits; (iii) a park brake engaged; (iv) a brake pedal command within predetermined limits; (v) a service hour interval being met; or (vi) a brake pressure within predetermined limits.

In another form of the apparatus, further comprising: a battery operatively connected to the controller.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 1:
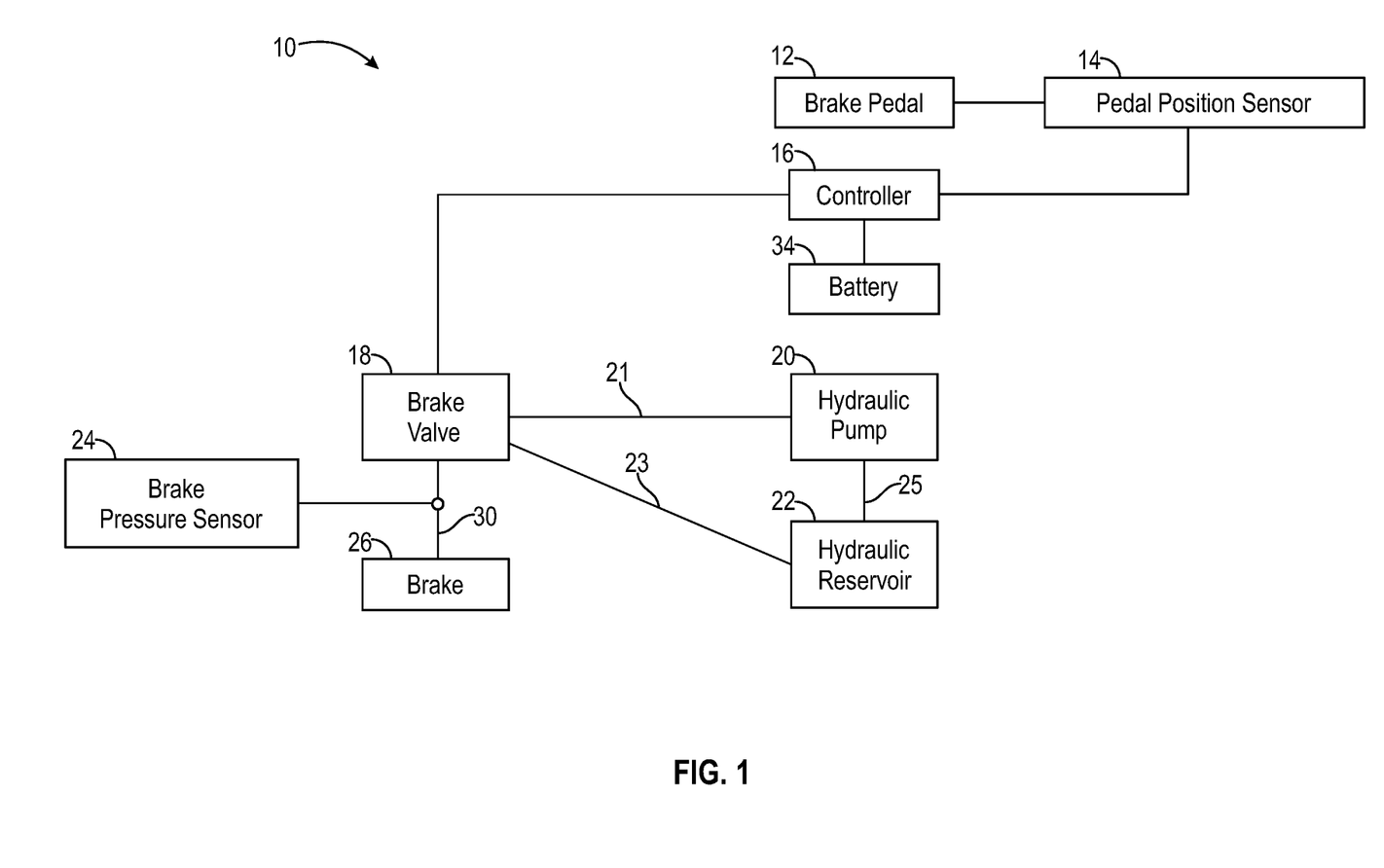
FIG. 1 is a schematic block diagram of a single brake valve circuit.
Figure 2:
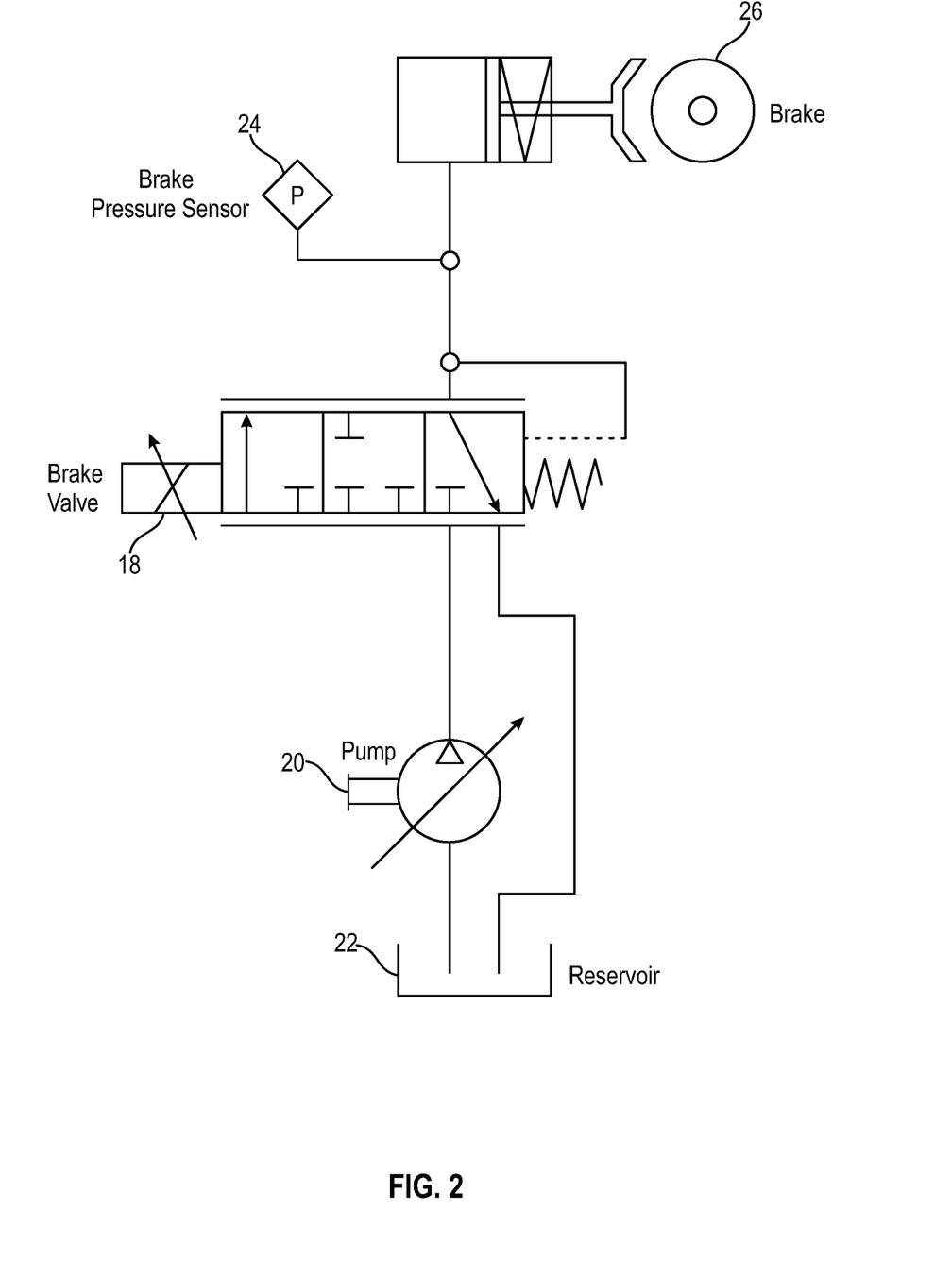
FIG. 2 is a hydraulic schematic of the FIG. 1 embodiment.

Referring to FIGS. 1 and 2 is a first example of a single brake valve system 10 for a vehicle (not illustrated). Some examples of vehicles that can include the brake system 10 include wheel loaders, 4WD loaders, tractors, trucks, and motor graders, to name a few. The brake system 10 is an electro-hydraulic braking system with an electronic brake pedal 12 operably coupled to a position sensor 14. As illustrated the electronic brake pedal 12 is not mechanically linked to a brake valve. The position sensor 14 measures a brake position of the brake pedal 12 which corresponds to an operator input braking demand. The position sensor 14 measures the position of the brake pedal 12 along its stroke path.

A controller 16 is operably connected to the position sensor 14, and the position sensor 14 is operably connected to the brake pedal 12 to read a pedal position of the brake pedal 12 with the position sensor 14 and determine an electrical signal to send to an electro-hydraulically operated hydraulic brake valve 18. In some forms, there are multiple sensors measuring the brake pedal position for redundancy. Since the brake pedal 12 is not mechanically linked to the brake valve 18, the controller 16 can be utilized to vary the command to the brake valve 18. For example, if the brake pedal 12 is only slightly pressed, the controller 16 can over-command the brake valve 18 to full activation while a brake 26 is being filled. Then when the brake 26 is fully filled, the command to the brake valve 18 can be reduced to a desired brake command by the operator. Doing this procedure allows the brake 26 to be filled quicker resulting in a quicker response of the braking system 10. One consideration is the amount of time that the controller 16 commands the brake valve 18 to full activation before matching the desired brake command. The amount of time required can vary between different types of brakes 26 due to the variance in the brake compliance. Among other things, the present application is directed to an amount of time to over-command the brake valve 18 for quick brake compliance fill times.

The brake system 10 includes an electro-hydraulically operated hydraulic brake valve 18 fluidly coupled to a hydraulic pump 20 via a hydraulic line 21 and a hydraulic reservoir 22 via a second hydraulic line 23. In other embodiments, the brake system 10 may further include additional hydraulic pumps 20 and hydraulic fluid reservoirs 22. The hydraulic reservoir or hydraulic reservoir 22 is fluidly coupled to the hydraulic pump 20 via a third hydraulic line 25. The hydraulic pump 20 operates to supply or pump pressurized hydraulic fluid from the hydraulic fluid reservoir 22 through the third hydraulic line 25 to the hydraulic pump 20 and then through the hydraulic line 21 to the brake valve 18. Optionally an accumulator can be assembled with the brake system 10 for storing pressurized hydraulic fluid. The hydraulic fluid is returned from the hydraulic brake valve 18 through the second hydraulic line 23 to the hydraulic fluid reservoir 22 after a braking event concludes. It is further contemplated and understood that the brake system 10 may include one or more actuators, and may include multiple hydraulic lines in any number of configurations as is known to one having skill in the art.

The brake system 10 includes a brake pressure sensor 24 fluidly coupled to the hydraulic brake valve 18 and in communication with the controller 16. The brake pressure sensor 24 may be generally mounted to a fourth hydraulic line 30 or directly to the brake valve 18 or to the brake assembly and measures hydraulic fluid pressure between the brake valve 18 and the brake 26 through the fourth hydraulic line 30. In one form, the brake pressure sensor 24 may be a displacement sensor. One example of a displacement sensor may be a volumetric sensor used to measure the volume of hydraulic fluid exiting and entering the brake 26.

The brake system 10 also includes a wheel or other type of brake 26 fluidly coupled to the brake pressure sensor 24 and the hydraulic brake valve 18. The brake pressure sensor 24 is configured to measure the pressure output of hydraulic fluid from the hydraulic brake valve 18 to the brake 26. The brake 26 is configured to apply a desired braking force to the vehicle.

In some forms, the brake system 10 may further include a multitude of sensors that may be in communication with the controller 16. These sensors may be positioned in any variety of locations on the vehicle and may measure vehicle deceleration as is known to one having skill in the art.

The controller 16 may include a computer-based processor (e.g., microprocessor) and a computer readable and writeable storage medium. Non-limiting examples of the controller 16 may include an arithmetic logic unit that performs arithmetic and logical operations; an electronic control unit that extracts, decodes, and executes instructions from a memory; and, an array unit that utilizes multiple parallel computing elements. Other examples of the controller 16 may include an engine control module, and an application specific integrated circuit. It is further contemplated and understood that the controller 16 may include redundant controllers, and/or the system may include other redundancies, to improve reliability of the brake system 10. Optionally, the controller 16 may be electrically connected to a battery 34 or other power source for supplying power to the controller 16. In one form, there are multiple controllers on the vehicle such as a first controller being operatively coupled with a front brake valve, and a second controller being operatively coupled with a rear brake valve. In this form, an operator presses on or engages a brake pedal to initiate a braking or retarding motion of the vehicle and the controller 16 controls the first brake valve and the second brake valve.

Figure 3:
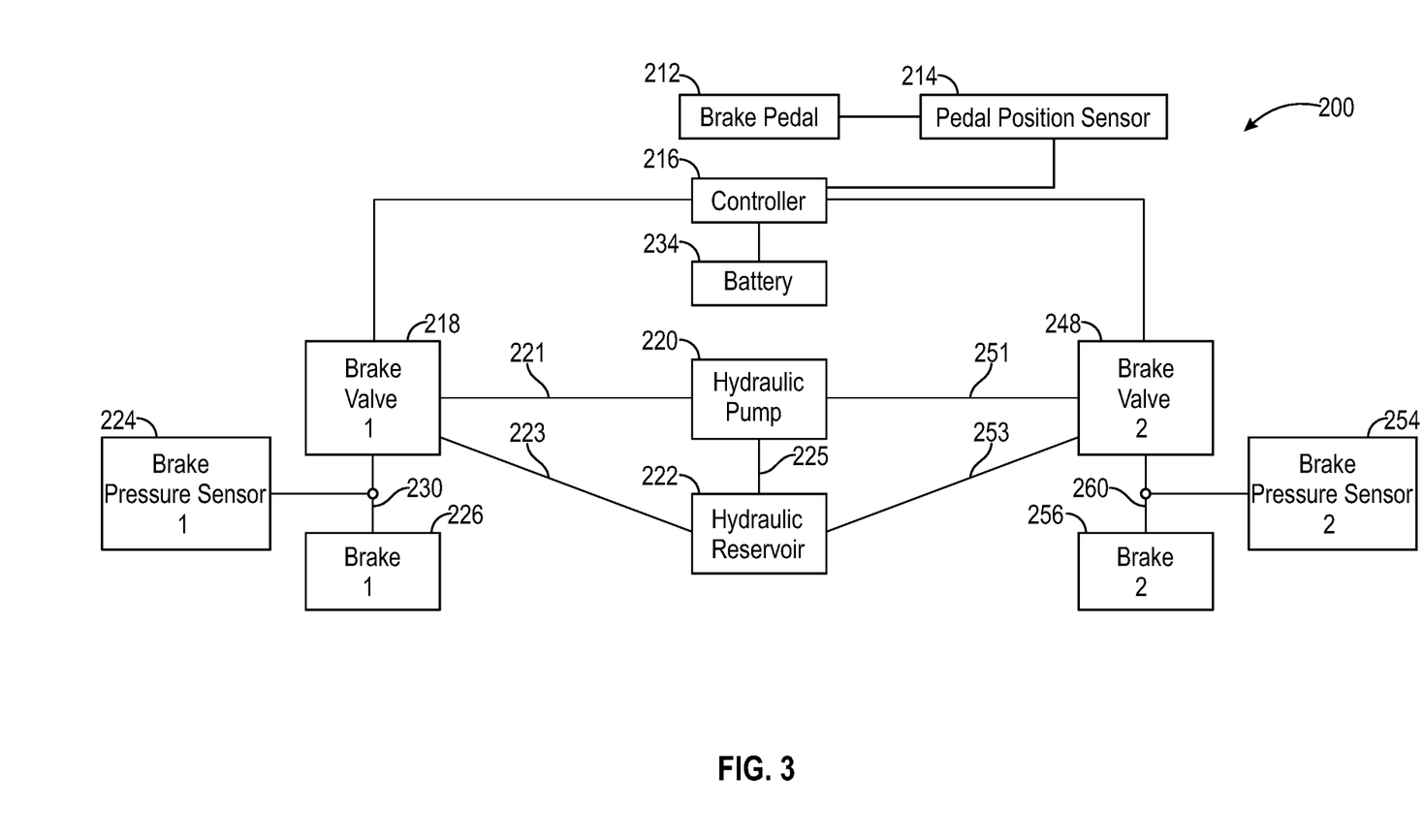
FIG. 3 is a schematic block diagram of a multiple brake valves circuit according to one embodiment.
Figure 4:
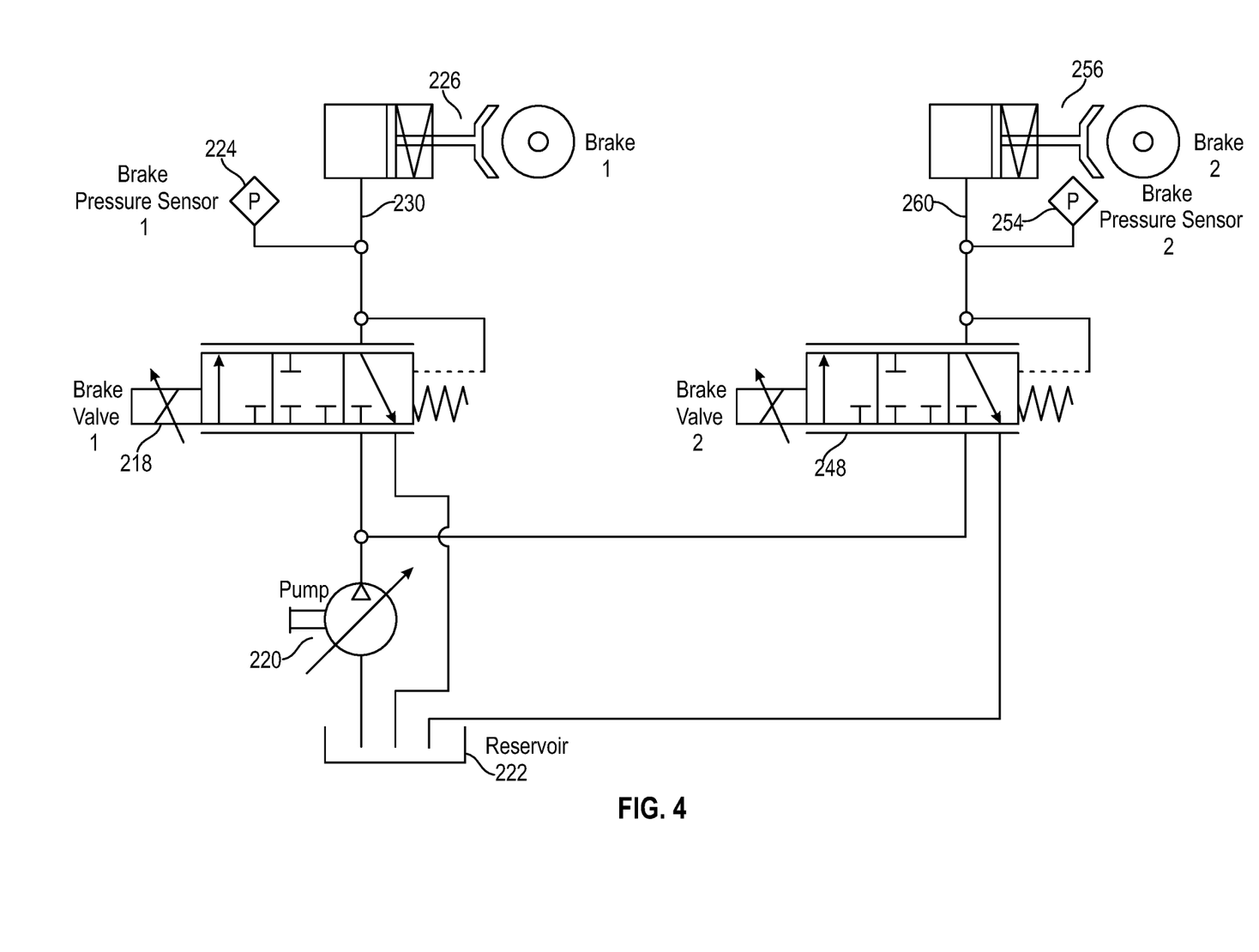
FIG. 4 is a hydraulic schematic of the FIG. 3 embodiment.

Referring to FIGS. 3 and 4 is a first example of a multiple brake valve system 200 for a vehicle (not illustrated). The multiple brake valve system 200 includes two or more EH brake valves that control separate brakes individually and independently from each other. Multiple EH brake valves may be on the machine for redundancy. In this embodiment, each of the EH brake valves are on a separate circuit with their own dedicated brake(s), and as such each brake circuit will have to be calibrated individually. The multiple brake valve system 200 is similar to the single brake valve system 10 described above, unless noted otherwise.

The brake system 200 is an electro-hydraulic braking system with an electronic brake pedal 212 operably coupled to a position sensor 214. As illustrated the electronic brake pedal 212 is not mechanically linked to a brake valve. The position sensor 214 measures a brake position of the brake pedal 212 which corresponds to an operator input braking demand. The position sensor 214 measures the position of the brake pedal 212 along its stroke path.

A controller 216 is operably connected to the position sensor 214, and the position sensor 214 is connected to the brake pedal 212 to read a pedal position of the brake pedal 212 and determine a first electrical signal to send to a first electro-hydraulically operated hydraulic brake valve 218 and a second electrical signal to send to a second electro-hydraulically operated hydraulic brake valve 248. In one form, there can be multiple sensors that measure the brake pedal position for redundancy. Since the brake pedal 212 is not mechanically linked to either of the first and second brake valves 218 and 248, the controller 216 can be utilized to vary the command to the first and second brake valves 218 and 248. For example, if the brake pedal 212 is only slightly pressed, the controller 216 can over-command either of the first brake valve 218 or the second brake valve 248 to full activation while a first brake 226 or a second brake 256, respectively, is being filled. Then when either of the first brake 226 or the second brake 256 is fully filled, the command to the respective first brake valve 218 or the second brake valve 248 can be reduced to a desired brake command by the operator. Doing this procedure allows the first brake 226 or the second brake 256 to be filled quicker resulting in a quicker response of the braking system 200. One consideration is the amount of time that the controller 216 commands the first brake valve 218 or the second brake valve 248 to full activation before matching the desired brake command. The amount of time required can vary between different types of brakes due to the variance in the brake compliance. Among other things, the present application is directed to an amount of time to over-command the first brake valve 218 or the second brake valve 248 for quick brake compliance fill times.

The brake system 200 includes a first EH brake valve 218 fluidly coupled to a hydraulic pump 220 via a hydraulic line 221 and a hydraulic reservoir 222 via a second hydraulic line 223. In other embodiments, the brake system 200 may further include additional hydraulic pumps 220 and hydraulic fluid reservoirs 222. The hydraulic reservoir or hydraulic reservoir 222 is fluidly coupled to the hydraulic pump 220 via a third hydraulic line 225. The hydraulic pump 220 operates to supply or pump pressurized hydraulic fluid from the hydraulic fluid reservoir 222 through the third hydraulic line 225 to the hydraulic pump 220 and then through the hydraulic line 221 to the first brake valve 218. Optionally an accumulator can be assembled with the brake system 200 for storing pressurized hydraulic fluid. The hydraulic fluid is returned from the first brake valve 218 through the second hydraulic line 223 to the hydraulic fluid reservoir 222 after a braking event concludes. It is further contemplated and understood that the brake system 200 may include one or more actuators, and may include multiple hydraulic lines in any number of configurations as is known to one having skill in the art.

The brake system 200 includes a second EH brake valve 248 fluidly coupled to the hydraulic pump 220 via a hydraulic line 251 and the hydraulic reservoir 222 via a second hydraulic line 253. The hydraulic pump 220 operates to supply or pump pressurized hydraulic fluid from the hydraulic fluid reservoir 222 through the third hydraulic line 225 to the hydraulic pump 220 and then through the hydraulic line 251 to the second brake valve 248. The hydraulic fluid is returned from the second brake valve 248 through the second hydraulic line 253 to the hydraulic fluid reservoir 222 after a braking event concludes.

The brake system 200 includes a first brake pressure sensor 224 fluidly coupled to the first brake valve 218 and in communication with the controller 216. The first brake pressure sensor 224 may be generally mounted to a fourth hydraulic line 230, directly to the first brake valve 218, or to the brake assembly, and measures hydraulic fluid pressure between the first brake valve 218 and the first brake 226 through the fourth hydraulic line 230. In one form, the first brake pressure sensor 224 may be a displacement sensor or a volumetric sensor used to measure the volume of hydraulic fluid exiting and entering the first brake 226.

The brake system 200 also includes a wheel or other type of first brake 226 fluidly coupled to the first brake pressure sensor 224 and the first brake valve 218. The first brake pressure sensor 224 is configured to measure the pressure output of hydraulic fluid from the first brake valve 218 to the first brake 226. The first brake 226 is configured to apply a desired braking force to the vehicle.

The brake system 200 includes a second brake pressure sensor 254 fluidly coupled to the second brake valve 248 and in communication with the controller 216. The second brake pressure sensor 254 may be generally mounted to a fourth hydraulic line 260, the second brake valve 248, or mounted to the brake assembly and measures hydraulic fluid pressure between the second brake valve 248 and the second brake 256 through the fourth hydraulic line 260. In one form, the second brake pressure sensor 254 may be a displacement sensor or a volumetric sensor used to measure the volume of hydraulic fluid exiting and entering the second brake 256.

The brake system 200 also includes a wheel or other type of second brake 256 fluidly coupled to the second brake pressure sensor 254 and the second brake valve 248. The second brake pressure sensor 254 is configured to measure the pressure output of hydraulic fluid from the second brake valve 248 to the second brake 256. The second brake 256 is configured to apply a desired braking force to the vehicle.

Figure 5:
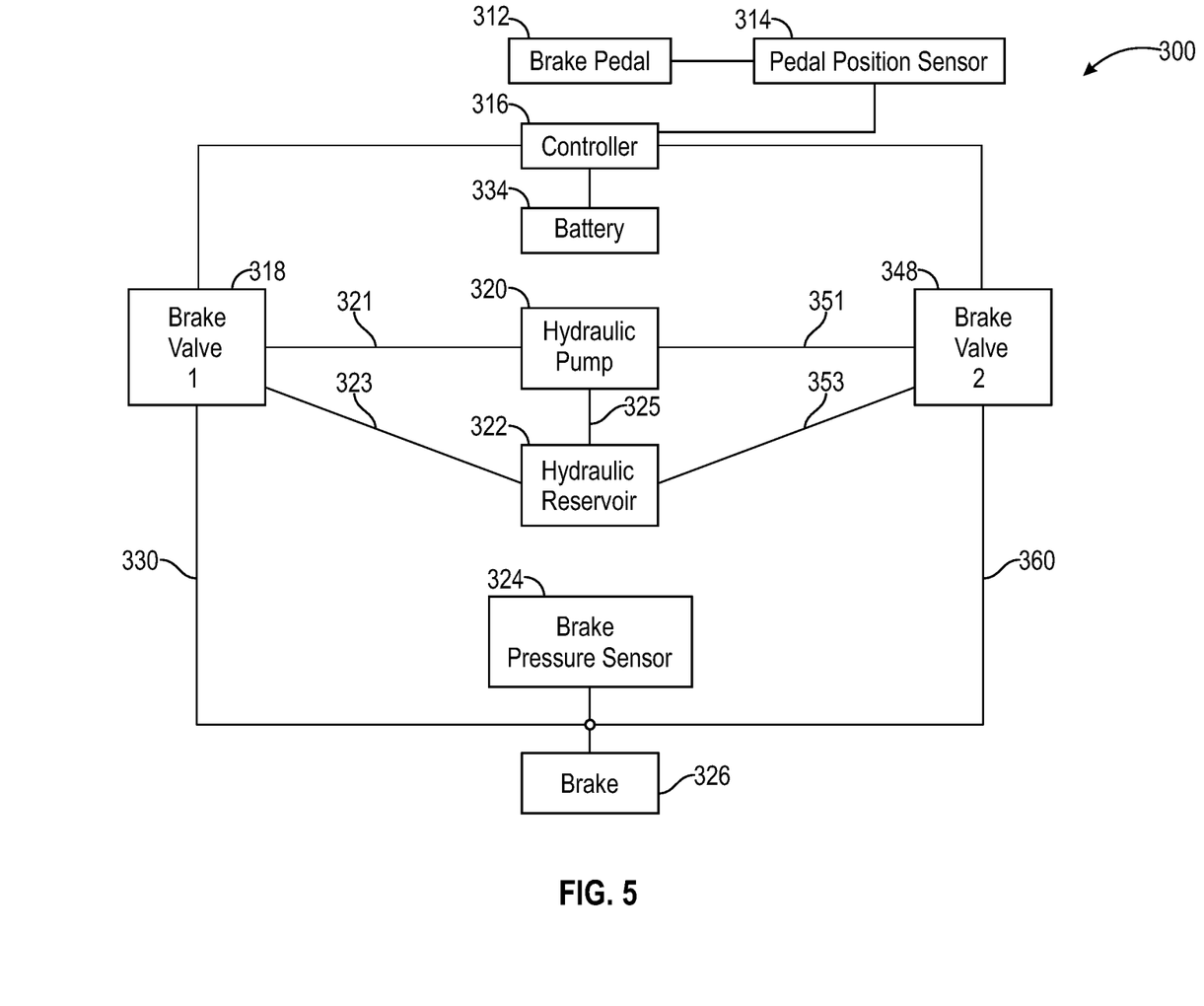
FIG. 5 is a schematic block diagram of a multiple brake valves circuit according to a second embodiment.
Figure 6:
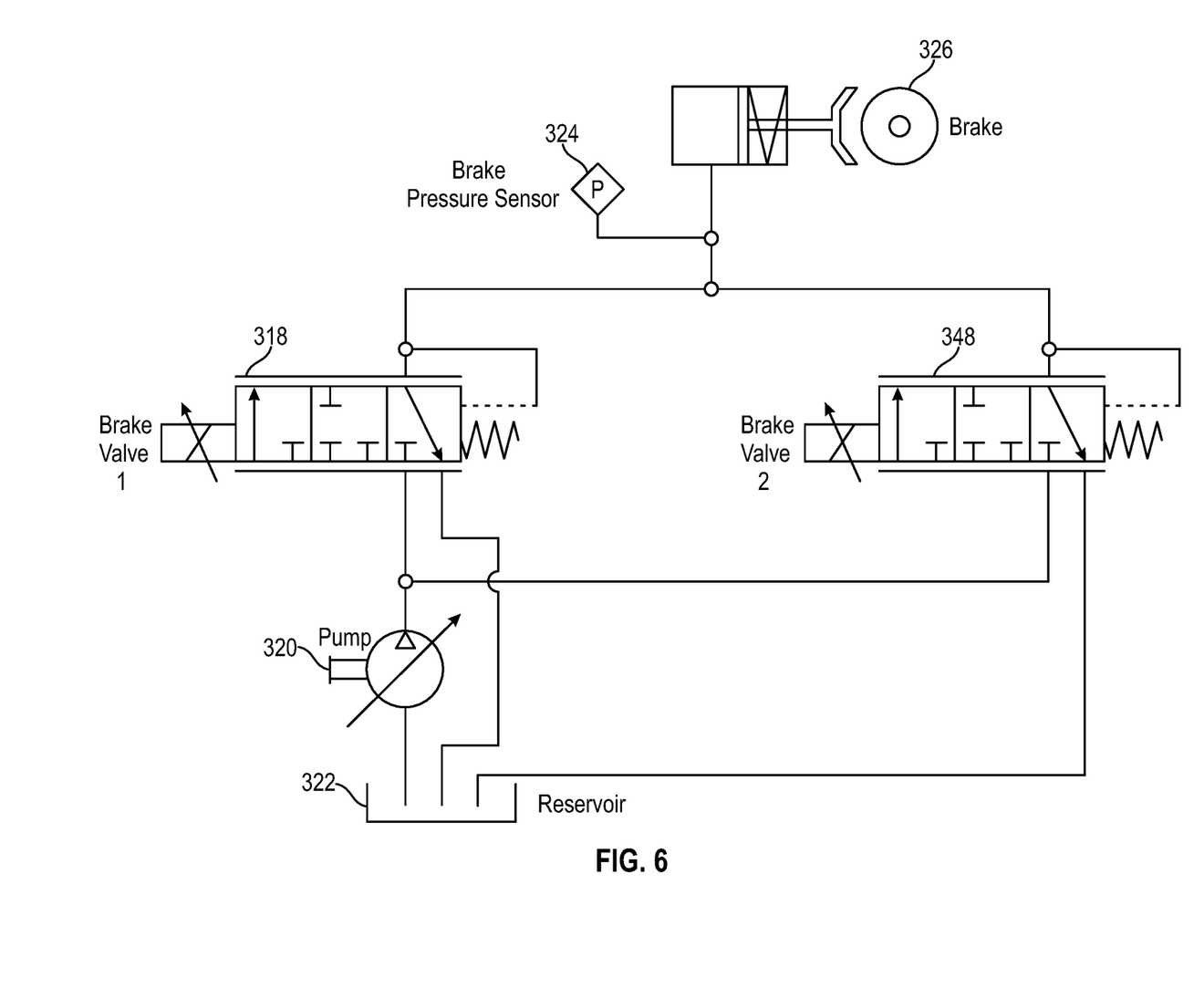
FIG. 6 is a hydraulic schematic of the FIG. 5 embodiment.

Referring to FIGS. 5 and 6 is a second example of a multiple brake valve system 300 for a vehicle (not illustrated). The multiple brake valve system 300 includes two or more EH brake valves that control a single brake. In this embodiment, the EH brake valves are on the same circuit controlling the same brake(s), and the circuits will have to be calibrated together by measuring the time between activating the multitude of brake valves to full activation and when the brake circuit pressure starts to build. Calibration of both brake valves must be done together because there are two brake valves that control a single brake 326. The multiple brake valve system 300 is similar to the multiple brake valve system 200 described above, unless noted otherwise.

The brake system 300 is an electro-hydraulic braking system with an electronic brake pedal 312 operably coupled to a position sensor 314. As illustrated the electronic brake pedal 312 is not mechanically linked to a brake valve. The position sensor 314 measures a brake position of the brake pedal 312 which corresponds to an operator input braking demand. The position sensor 314 measures the position of the brake pedal 312 along its stroke path.

A controller 316 is operably connected to the position sensor 314, the position sensor 314 is operably connected to the brake pedal 312 to read a pedal position of the brake pedal 312 with the position sensor 314 and determine a first electrical signal to send to a first electro-hydraulically operated hydraulic brake valve 318 and a second electrical signal to send to a second electro-hydraulically operated hydraulic brake valve 348. Since the brake pedal 312 is not mechanically linked to either of the first and second brake valves 318 and 348, the controller 316 can be utilized to vary the command to the first and second brake valves 318 and 348. For example, if the brake pedal 312 is only slightly pressed, the controller 316 can over-command either of the first brake valve 318 or the second brake valve 348 to full activation while a brake 326 is being filled. Then when the brake 326 is fully filled, the command to the either of brake valve 318 or the second brake valve 348 can be reduced to a desired brake command by the operator. Doing this procedure allows the brake 326 to be filled quicker resulting in a quicker response of the braking system 300. One consideration is the amount of time that the controller 316 commands the brake valve 318 to full activation before matching the desired brake command. The amount of time required can vary between different types of brakes due to the variance in the brake compliance. Among other things, the present application is directed to an amount of time to over-command the first brake valve 318 for quick brake compliance fill times.

The brake system 300 includes a first EH brake valve 318 fluidly coupled to a hydraulic pump 320 via a hydraulic line 321 and a hydraulic reservoir 322 via a second hydraulic line 323. In other embodiments, the brake system 300 may further include additional hydraulic pumps 320 and hydraulic fluid reservoirs 322. The hydraulic reservoir or hydraulic 322 is fluidly coupled to the hydraulic pump 320 via a third hydraulic line 325. The hydraulic pump 320 operates to supply or pump pressurized hydraulic fluid from the hydraulic fluid reservoir 322 through the third hydraulic line 325 to the hydraulic pump 320 and then through the hydraulic line 321 to the first brake valve 318. Optionally an accumulator can be assembled with the brake system 300 and the hydraulic pump 320 for storing pressurized hydraulic fluid. The hydraulic fluid is returned from the first brake valve 318 through the second hydraulic line 323 to the hydraulic fluid reservoir 322 after a braking event concludes. It is further contemplated and understood that the brake system 300 may include one or more actuators, and may include multiple hydraulic lines in any number of configurations as is known to one having skill in the art.

The brake system 300 includes a second EH brake valve 348 fluidly coupled to the hydraulic pump 320 via a hydraulic line 351 and the hydraulic reservoir 322 via a second hydraulic line 353. The hydraulic pump 320 operates to supply or pump pressurized hydraulic fluid from the hydraulic fluid reservoir 322 through the third hydraulic line 325 to the hydraulic pump 320 and then through the hydraulic line 351 to the second brake valve 348. The hydraulic fluid is returned from the second brake valve 348 through the second hydraulic line 353 to the hydraulic fluid reservoir 322 after a braking event concludes.

The brake system 300 includes a brake pressure sensor 324 fluidly coupled to the first brake valve 318 and to the second brake valve 348 and in communication with the controller 316. The brake pressure sensor 324 may be generally mounted to a fourth hydraulic line 330 and a fifth hydraulic line 360, or directly to the brake 326. The brake pressure sensor 324 measures hydraulic fluid pressure between the first brake valve 318 and the brake 326 through the fourth hydraulic line 330 and measures hydraulic fluid pressure between the second brake valve 348 and the brake 326 through the fifth hydraulic line 360. In one form, the brake pressure sensor 324 may be a displacement sensor or a volumetric sensor used to measure the volume of hydraulic fluid exiting and entering the brake 326.

The brake system 300 also includes a wheel or other type of brake 326 fluidly coupled to the brake pressure sensor 324, the first brake valve 318, and the second brake valve 348. The brake pressure sensor 324 is configured to measure the pressure output of hydraulic fluid from the first brake valve 318 and the second brake valve 348 to the brake 326. The brake 326 is configured to apply a desired braking force to the vehicle.

Figure 7:
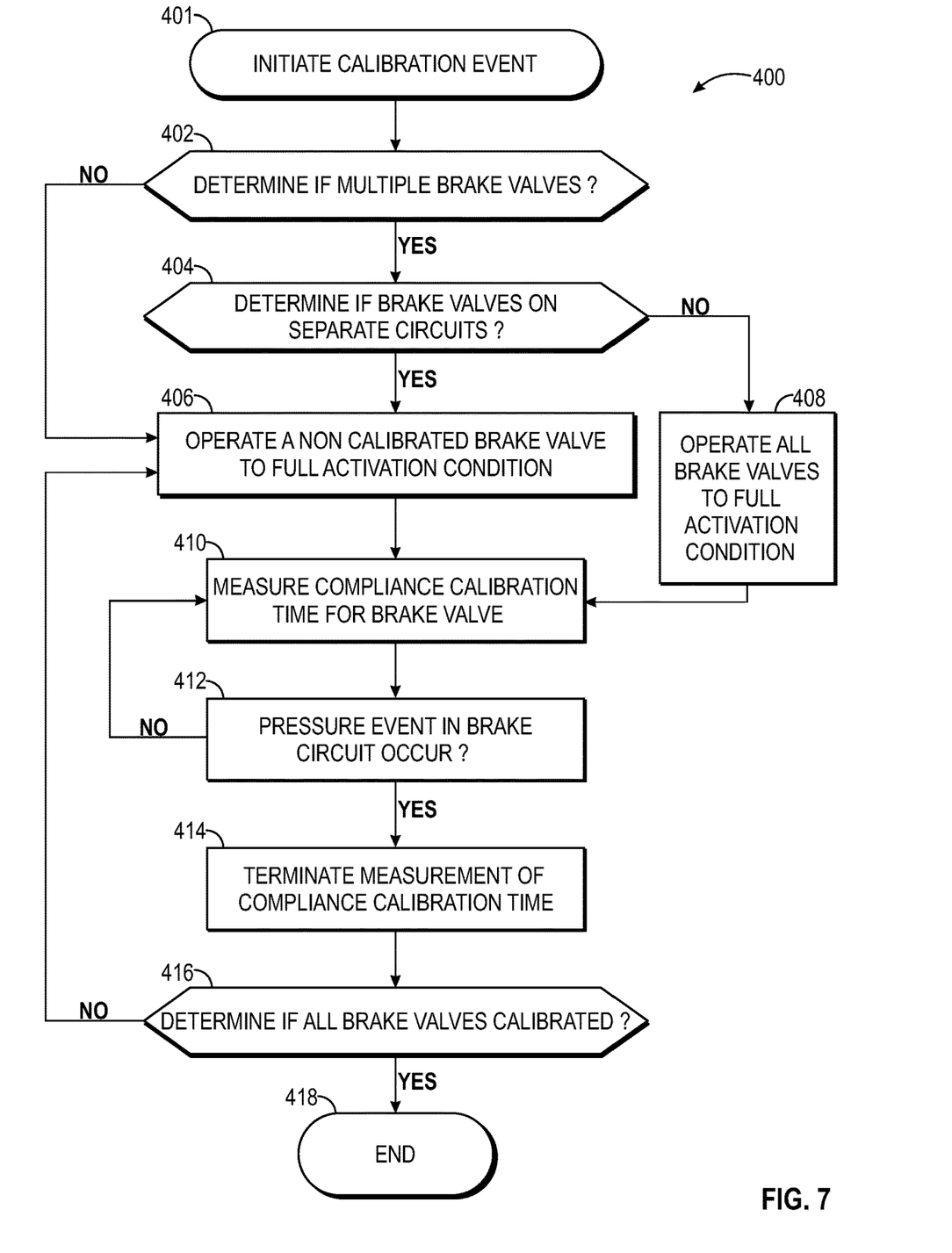
FIG. 7 is a schematic flow diagram of a calibration procedure for managing a braking operation of the FIGS. 1-6 embodiments.

Referring now to FIG. 7, there is shown a procedure 400 for operating the brake system embodiments described herein. Procedure 400 starts at operation 401 wherein the controller 16 (216, or 316) is configured to initiate a calibration event associated with the corresponding EH braking systems 10, 200, or 300. Initiating the calibration event occurs in response to one or more conditions being met that include: a calibration request initiated by the operator through the vehicle monitor; a calibration automatically initiated by the vehicle software at machine start up; or a calibration automatically initiated by the vehicle software when the park brake is applied. Furthermore, to initiate the calibration event, one or more of the following pre-conditions may be required: (i) a hydraulic oil temperature within predetermined limits; (ii) an engine speed within predetermined limits; (iii) a park brake engaged; (iv) a brake pedal command within predetermined limits; (v) a service hour interval being met; (vi) a brake pressure within predetermined limits; as can be appreciated, a service hour requirement being met accounts for wear and tear of parts of a machine so may need to recalibrate over time.

At operation 402, the controller 16 (216, 316) determines if there are multiple brake valves in the corresponding EH braking system. If there are multiple brake valves, then at operation 404 the controller 216 or 316 determines if the brake valves are on separate circuits, i.e., associated with separate brakes or the same brake. If the multiple brake valves are on separate circuits, then at operation 406, a non-calibrated brake valve is operated at full activation condition. From operation 402, if there is a single brake valve then the procedure 400 proceeds to operation 406. From operation 404, if the brake valves are on the same circuit or operatively connected to the same brake, then the procedure 400 continues to operation 408 wherein all of the brake valves are operated to full activation condition.

At operation 406, the corresponding controller is configured to operate the non-calibrated brake valve to a full activation condition. At operation 410, the controller is configured to measure a compliance calibration fill time for the brake valve in response to operation of the brake valve at the full activation condition. Compliance fill time is dependent on brake compliance volume which can vary from part to part due to manufacturing tolerances. The present application accounts for this part to part variance to improve brake performance consistency from machine to machine. This compliance fill time can be measured in the factory when the machine is assembled or in field after use of the machine as described above. To determine the amount of time to over-command the brake valve(s) for a quicker brake compliance fill time and account for variance in brake compliance, a calibration can be conducted. To calibrate the compliance fill time, an operator may select a screen in the machine monitor to conduct a compliance calibration.

At operation 412, the controller is configured to determine a pressure event associated with the brake pressure sensor. At operation 412, if the pressure event occurs, then at operation 414, the controller terminates the measurement of the compliance calibration time in response to the pressure event. At operation 412, if the pressure event does not occur then the controller continues at operation 410.

At operation 416, the controller is configured to determine if all of the brake valves have been calibrated. If yes, then the procedure 400 ends at operation 418. If all of the brake valves have not been calibrated, then the procedure returns to operation 402 and repeats until all of the brake valves have been calibrated.

In an alternative embodiment, instead of relying on a calibration of the brake valves, the controller can be configured to always command full activation of the brake valve until the pressure starts to rise and then lower the command to the operator demand. In this embodiment, this operation would eliminate the need for a calibration and would be self-adjusting over time as the brake systems wears.

Figure 8:
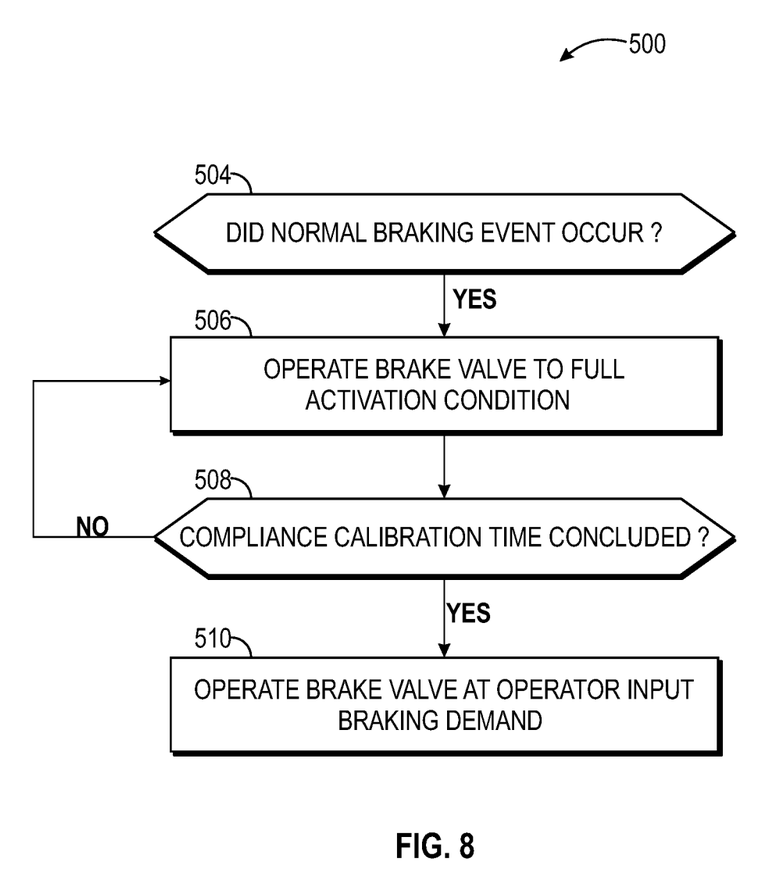
FIG. 8 is a schematic flow diagram of a normal braking procedure for the FIGS. 1-7 embodiments.

Referring now to FIG. 8, there is shown a procedure 500 for operating the brake system embodiments described herein. If a brake compliance calibration is not active, procedure 500 will be followed. Procedure 500 starts at operation 504 to detect if a normal braking event occurred. A normal braking event is when the pedal position sensor(s) measure that the operator engaged the brake pedal.

If a normal braking event occurs, then the procedure continues to operation 506 to operate the brake valve to a full activation condition in response to the normal braking event. At operation 508, the brake valve is operated to the full activation condition for duration of the compliance calibration time determined at operation 414. At operation 508, the controller determines if the compliance calibration time has concluded. Optionally an offset in the measured compliance calibration time can be accounted for to reduce the measured compliance calibration time by the offset. When the controller finds the measured compliance calibration time at operation 508, the controller may reduce the time by the offset. This offset would ensure that the brake valve is not held at full current for too long. Holding the brake valve at full current too long may result in a moment of full braking when the operator did not command it. In a normal braking operation, the time that the brake valve is held at full current can be hydraulic oil temperature based. For example, holding the brake valve at full current longer at lower hydraulic oil temperatures because the brake valve may flow less oil at lower temperatures resulting in a longer time to fill the brake compliance volume. For normal braking, the time that the brake valve is at full current may also depend on the brake pressure before the pedal was pressed.

For example, if there wasn't enough wait time between brake applications for the oil to drain out, there may still be oil trapped in the brake circuit which would reduce the brake compliance volume. To account for this, maybe the time the brake valve is held at full current may change with the pressure in the brake prior to the brake application. In another embodiment, if the pressure in the brake prior to the application is above a threshold, then do not over-command the brake valve because the compliance is likely already filled as such the time will be changed based on the pressure in the brake prior to the brake application.

If the compliance calibration time has concluded then the procedure continues to operation 510, and the controller operates the brake valve at an operator input braking condition in response to the duration of the compliance calibration time being met. If the compliance calibration time has not concluded then the procedure returns to operation 506.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

What is claimed is:

1. A method, comprising:
    initiating a calibration event for an electro-hydraulic braking system including a brake valve operably connected to a brake and a brake pressure sensor, and a controller operably connected to the electro-hydraulic braking system;
    operating the brake valve to a full activation condition;
    measuring a compliance calibration time for the brake valve in response to operation of the brake valve at the full activation condition;
    determining a pressure event associated with the brake pressure sensor; and
    terminating the measurement of the compliance calibration time in response to occurrence of the pressure event.

2. The method according to claim 1, further comprising:
    wherein the electro-hydraulic braking system includes a second brake valve operably connected to a second brake and a second brake pressure sensor;
    operating the second brake valve to a full activation condition;
    measuring a compliance calibration time for the second brake valve in response to operation of the second brake valve at the full activation condition;
    determining a pressure event associated with the second brake pressure sensor; and
    terminating the measurement of the compliance calibration time in response to occurrence of the pressure event.

3. The method according to claim 1, further comprising:
    wherein the electro-hydraulic braking system includes a second brake valve operably connected to the first brake and first brake pressure sensor;
    concurrently operating the first and second brake valves to a full activation condition;
    measuring a compliance calibration time for the braking system in response to concurrent operation of the first and second brake valves at the full activation condition;
    determining a pressure event associated with the brake pressure sensor; and
    terminating the measurement of the compliance calibration time in response to occurrence of the pressure event.

4. The method according to claim 1, further comprising:
    detecting a normal braking event of the electro-hydraulic braking system; and
    operating the brake valve to a full activation condition for duration of the compliance calibration time in response to the normal braking event.

5. The method according to claim 4, further comprising:
    operating the brake valve at an operator input braking condition in response to the duration of the compliance calibration time being met.

6. The method according to claim 4, wherein electro-hydraulic braking system includes a brake pedal coupled to a position sensor configured to measure a brake pedal position, the detecting the normal braking event includes measuring the brake pedal position in response to an operator input braking demand.

7. The method according to claim 4, further comprising:
    if the operator releases the pedal prior to the compliance calibration time being met, the full activation condition of the brake valve shall be cancelled and instead the brake valve command will once again follow the brake pedal demand.

8. The method according to claim 1, wherein electro-hydraulic braking system includes a hydraulic pump for pumping hydraulic fluid from a hydraulic fluid reservoir to the brake valve.

9. The method according to claim 1, wherein the controller is configured to initiate the calibration event in response to one of the following conditions being met:
    (i) a calibration request initiated by the operator through the vehicle monitor;
    (ii) a calibration automatically initiated by the vehicle software at machine start up; or
    (iii) a calibration automatically initiated by the vehicle software when the park brake is applied.

10. The method according to claim 1, wherein the controller is configured to require one or more of the following pre-conditions to be met to initiate the calibration event:
    (i) a hydraulic oil temperature within predetermined limits;
    (ii) an engine speed within predetermined limits;
    (iii) a park brake engaged;
    (iv) a brake pedal command within predetermined limits;
    (v) a service hour interval being met; or
    (vi) a brake pressure within predetermined limits.

11. An apparatus, comprising:
    an electro-hyrdaulic braking system including a brake valve operably connected to a brake and a brake pressure sensor;
    a controller operably connected to the electro-hydraulic braking system, wherein the controller is configured to:
    initiate a calibration event associated with the electro-hydraulic braking system;
    operate the brake valve to a full activation condition;
    measure a compliance calibration time for the brake valve in response to operation of the brake valve at the full activation condition;
    determine a pressure event associated with the brake pressure sensor; and
    terminate the measurement of the compliance calibration time in response to the pressure event.

12. The apparatus according to claim 11, further comprising:
wherein the electro-hydraulic braking system includes a second brake valve operably connected to a second brake and a second brake pressure sensor;
wherein the controller is configured to:
operate the second brake valve to a full activation condition;
measure a compliance calibration time for the second brake valve in response to operation of the second brake valve at the full activation condition;
determine a pressure event associated with the second brake pressure sensor; and
terminate the measurement of the compliance calibration time in response to the pressure event.

13. The apparatus according to claim 11, further comprising:
wherein the electro-hydraulic braking system includes a second brake valve operably connected to the brake and the brake pressure sensor;
wherein the operate the brake valve includes the controller configured to operate the second brake valve to a full activation condition;
wherein the measure the compliance calibration time includes the controller configured to measure a second compliance calibration time for the second brake valve in response to operation of the second brake valve at the full activation condition; and
wherein the terminate the measurement of compliance calibration time includes the controller configured to terminate the measurement of the second compliance calibration time in response to the pressure event.

14. The apparatus according to claim 11, further comprising:
the controller is configured to detect a normal braking event during travel motion of a vehicle that includes the electro-hydraulic braking system; and
the controller configured to operate the brake valve to the full activation condition for duration of the compliance calibration time in response to the normal braking event.

15. The apparatus according to claim 14, further comprising:
the controller is configured to operate the brake valve at an operator input brake demand in response to the duration of the compliance calibration time being met.

16. The apparatus according to claim 14, wherein the electro-hydraulic braking system includes a brake pedal coupled to a position sensor configured to measure a brake pedal position, the detection of the normal braking event includes measuring the brake pedal position in response to an operator input brake demand.

17. The apparatus according to claim 11, wherein the electro-hydraulic braking system includes a hydraulic pump configured to pump hydraulic fluid from a hydraulic fluid reservoir to the brake valve.

18. The apparatus according to claim 11, wherein the controller is configured to initiate the calibration event in response to one of the following conditions being met:
(i) a calibration request initiated by the operator through the vehicle monitor;
(ii) a calibration automatically initiated by the vehicle software at machine start up; or
(iii) a calibration automatically initiated by the vehicle software when the park brake is applied.

19. The apparatus according to claim 18, wherein one or more of the following pre-conditions must be met prior to initiation of the calibration event:
(i) a hydraulic oil temperature within predetermined limits;
(ii) an engine speed within predetermined limits;
(iii) a park brake engaged;
(iv) a brake pedal command within predetermined limits;
(v) a service hour interval being met; or
(vi) a brake pressure within predetermined limits.

20. The apparatus according to claim 11, further comprising:
a battery operatively connected to the controller.

* * * * *